UNITED STATES PATENT OFFICE.

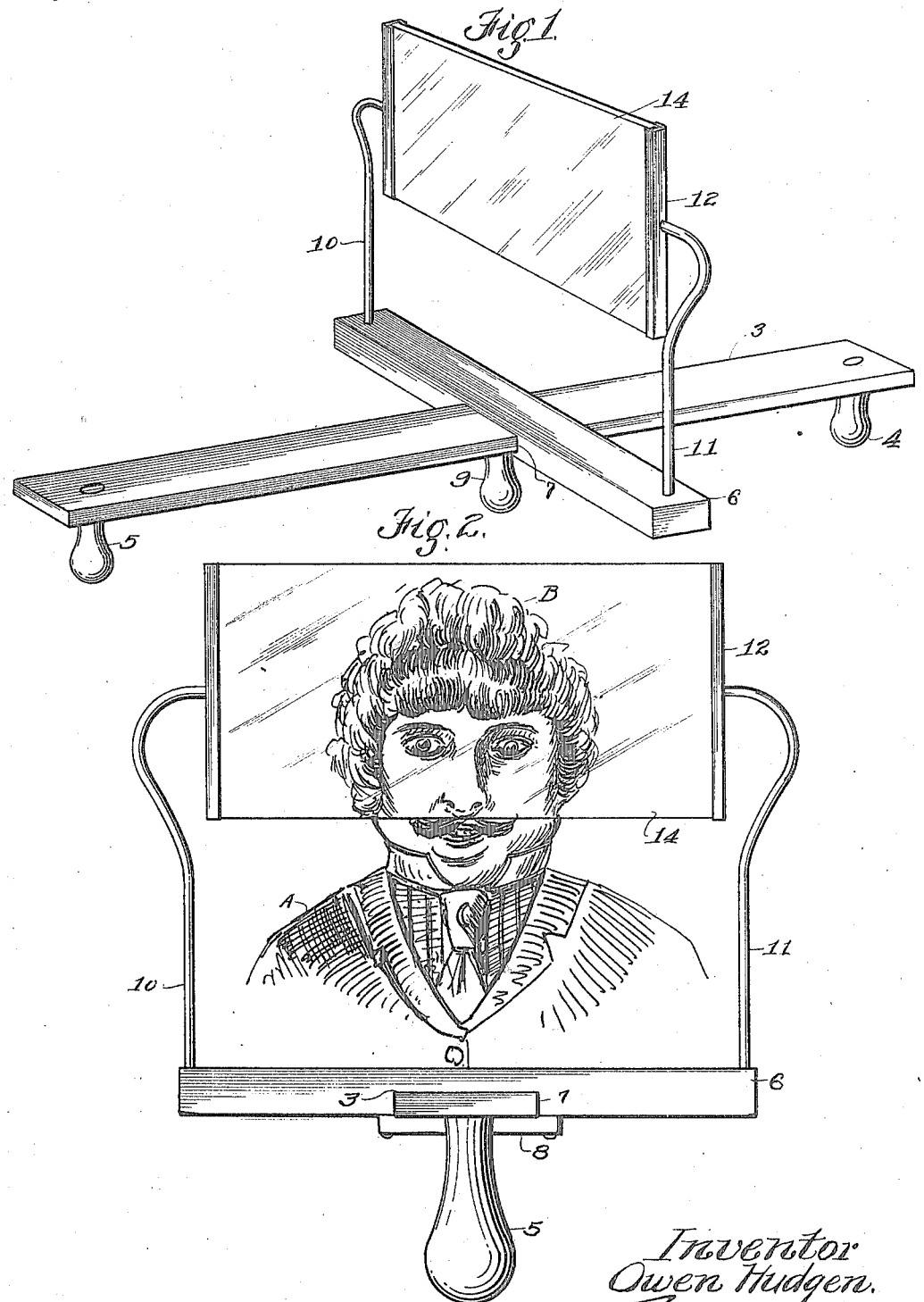

OWEN HUDGEN, OF LOS ANGELES, CALIFORNIA.

OPTICAL-ILLUSION DEVICE.

1,268,010. Specification of Letters Patent. Patented May 28, 1918.

Application filed April 2, 1917. Serial No. 159,356.

*To all whom it may concern:*

Be it known that I, OWEN HUDGEN, a citizen of the United States, residing at Los Angeles, in the county of Los Angeles and State of California, have invented new and useful Improvements in Optical - Illusion Devices, of which the following is a specification.

This invention relates to a device for optically producing composite images.

It is an object of this invention to provide an apparatus which is instructive, entertaining, and amusing. To this end, I have provided a device carrying a mirror; the latter is so arranged that it may be disposed between two persons and in the line of sight of both, so as to mask a portion of the direct image of the observed person, and, by reflection, substitute for the masked portion a corresponding reflected image of the observer. In this manner composite images are formed which are a source of amusement for the observers.

I have illustrated an embodiment of my invention in the accompanying drawing, in which:

Figure 1 is a perspective view of a complete device, and

Fig. 2 is an end view illustrating the use of the device.

Referring more particularly to the drawing, 3 indicates a slide bar, which serves as a base for supporting a frame and its mirror. The bar 3 is herein shown as consisting of a rectangular strip of material such as wood, but may be of any other suitable material or form, such as a tube or a wire slide. For convenience in holding the base, I have provided handles 4 and 5 which depend from the ends of the base.

Slidingly mounted upon the bar 3 is a frame comprising a cross bar 6. A recess 7 is provided in bar 6 of such size that the base 3 fits within the recess. A piece 8, of any suitable form, bridges the recess, and incloses the bar 3 therein. The piece 8 is secured to the cross bar 6. Depending from the cross bar is a handle 9 for manually adjusting the position of the frame.

Upstanding from the ends of the cross bar 6 are standards 10 and 11 affixed at their lower ends to the cross bar and suitably shaped to pivotally support a frame 12. The frame 12 is of channel form and carries a mirror 14. As shown recesses are formed in the frame, serving as bearings in which the inturned ends of standards 10 and 11 are journaled. Any other suitable means of supporting the mirror from the cross bar is within the scope of my invention. The top edge of the mirror is preferably a straight edge, and the bottom edge is spaced above the cross bar 6.

The device is supported between two persons facing one another, each holding an end of the base 3 which they may conveniently do by means of the handles 4 and 5. The mirror will mask a portion of the observed person's face—either the upper or lower part, depending upon the position in which the mirror is held. Referring particularly to Fig. 2 the observed person A has the upper half of his face masked by the mirror. The observer sees in the mirror 14 the upper half of her own face reflected. This portion of the face is indicated by B. The observer now adjusts the mirror by sliding the frame to a position such that the reflected half of B's face and the visible half of A's face register to produce a composite image. By raising the mirror, that is, tilting the slide so that the lower portion of A's face is masked, a different picture is produced. The composite picture will then comprise the upper half of B's face and the upper half of A's. In order for A to be the observer the mirror is turned over, and the frame adjusted for A's sight.

It is within the scope of my invention to use a double face mirror so that it will not be necessary to turn the mirror. I have, however, shown herein a single mirror, which I prefer.

What I claim is:

1. In an optical illusion device, the combination of an unframed mirror, and means supporting said mirror at its ends so that the position of the latter may be adjusted, whereby composite images may be produced.

2. In an optical illusion device, the combination of a base, an unframed mirror, and means supporting said mirror at its ends, said means slidably mounted on said base, whereby composite images may be produced.

3. In an optical illusion device, the combination of a slide, a frame mounted thereon for adjustably positioning the same along said slide, and an unframed mirror supported at its ends in said frame, whereby composite images may be produced.

4. In an optical illusion device, the combination of a base, a frame slidably mounted on said base, said frame provided with means for manually adjusting its position on said base, and an unframed mirror supported at its ends in said frame, whereby composite images may be produced.

5. In an optical illusion device, the combination of an elongated slide bar provided at each end with a handle, a cross bar slidably mounted on said slide, upwardly extending supporting standards mounted on said cross bar, and an unframed mirror pivotally supported by said standards.

In witness that I claim the foregoing I have hereunto subscribed my name this 19th day of March, 1917.

OWEN HUDGEN.

Copies of this patent may be obtained for five cents each, by addressing the "Commissioner of Patents, Washington, D. C."